April 13, 1954 J. H. McGUIGAN 2,675,539

CHECKING CIRCUIT

Filed March 5, 1953 2 Sheets-Sheet 1

INVENTOR
J. H. MC GUIGAN
BY [signature]
ATTORNEY

April 13, 1954 J. H. McGUIGAN 2,675,539

CHECKING CIRCUIT

Filed March 5, 1953 2 Sheets-Sheet 2

INVENTOR
J. H. MC GUIGAN
BY
[signature]
ATTORNEY

Patented Apr. 13, 1954 2,675,539

UNITED STATES PATENT OFFICE 2,675,539

CHECKING CIRCUIT

John H. McGuigan, New Providence, N. J., assignor to Bell Telephone Laboratories, Incorporated, New York, N. Y., a corporation of New York Application March 5, 1953, Serial No. 340,595

5 Claims. (Cl. 340—149)

This invention relates to electrical circuits and more particularly to the checking of coded information in such circuits.

In various electrical systems, such as may be employed in computers, telephone switching control systems, etc., information is transferred in the form of pulses appearing, in accordance with a predetermined code, simultaneously on a number of parallel leads. Such a system, an example of which is the telephone system described in application Serial No. 340,471, filed March 5, 1953, of W. A. Malthaner and H. E. Vaughan, displays improved reliability if the coded information can be checked to determine that it is plausible in terms of the code.

One checking circuit wherein summing networks are employed is disclosed in application Serial No. 340,473, filed March 5, 1953, of W. A. Malthaner and D. H. Ring. In that checking circuit two summing networks of resistors are provided, each network including a resistor for each possible pulse in the code. Each resistor of one network may be considered as paired with a resistor in the other network. When an information message appears as a number of pulses on the parallel leads, a register toggle circuit is triggered for each pulse and provides a positive pulse to one resistor of the first summing network and an equal negative pulse to the paired resistor of the second summing network.

Initially each resistor of the one summing network had a certain voltage applied to it and each resistor of the other summing network a certain other voltage applied to it. The appearance of these pulses causes the voltage at the common point of the one network to increase and that at the common point of the other network to decrease. The voltages at these common points are joined together and the lower or higher voltage applied to comparator circuits which indicate that the information message being checked is plausible if the voltage changes at the common points of the summing networks are such as to be equal and not plausible if unequal.

It is a general object of this invention to provide an improved checking circuit of the type disclosed in the application of Malthaner and Ring for parallel operating systems.

More specifically it is an object of this invention to simplify such circuits and to increase their operating margins to prevent the possibility of erroneous operation.

These and other objects of this invention are attained in a specific embodiment wherein two summing networks of the type disclosed by Malthaner and Ring are utilized. Each of the common points of the summing networks is connected through a varistor or other unidirectional current element to an amplitude comparator circuit, the varistors being so poled that only the lower of the voltages at the common points is applied to the comparator circuit. The comparator circuit is biased so as to be triggered by the voltage which occurs when the voltages at the common points of the summing networks are equal. Thus when exactly half the register toggles are tripped the comparator circuit is triggered, indicating a correctly coded information message.

In accordance with one aspect of this invention, a large operating margin is provided for the comparator circuit between the voltage level at which the circuit is triggered and the voltage level for an improperly coded information message by providing positive feedback within the comparator circuit so that a negative terminating resistance appears to the voltage from the varistors when the voltages at the common points of the summing networks are equal, thereby increasing the voltage from the varistors and assuring positive and rapid operation of the comparator circuit.

It is a feature of this invention that only the lower of the two voltages at the common points of the summing networks be applied to a comparator network which is biased to be triggered only when the voltages at the common points are equal, thereby indicating a correctly coded information message, and that a negative terminating resistance is applied to the voltage from the common points of the networks only when the voltages at the common points are equal. Thus it is a feature of this invention that the comparator network may be biased to be triggered by a voltage but slightly below that at which the voltages at the common points are equal without impairing the rapidity and the definiteness of the operation of the comparator circuit.

These and other desirable features of this invention may be completely understood from consideration of the following detailed description and the accompanying drawing, in which.

Figure 1:
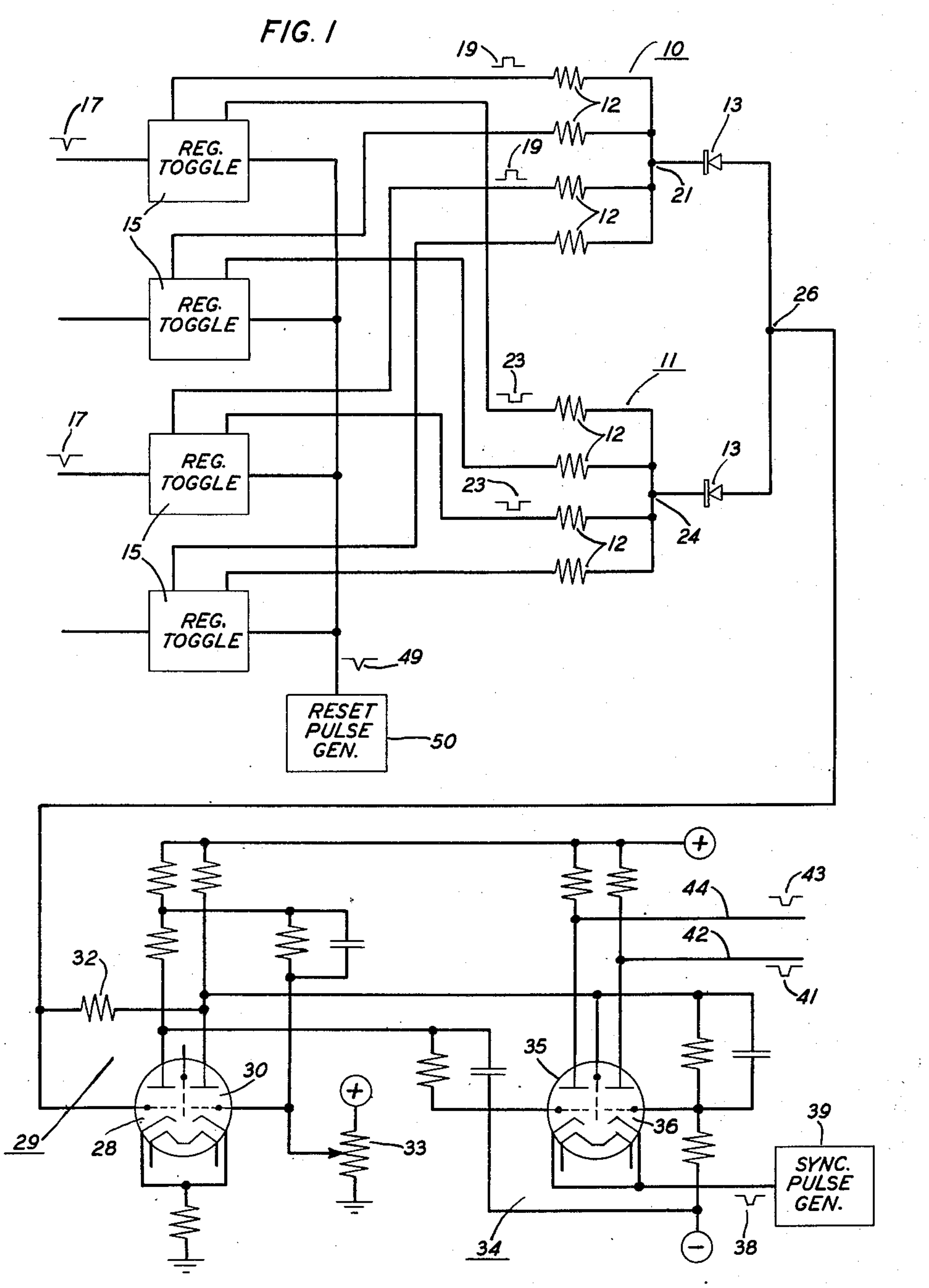
Fig. 1 is a schematic representation of one illustrative embodiment of this invention for checking information in a two-out-of-four code.

Turning now to the drawings, one specific illustrative embodiment of this invention for checking information messages in a two-out-of-four code is depicted in Fig. 1. As there seen, two summing networks 10 and 11 each comprise equal resistors 12. The output of the networks 10 and 11 are combined through unidirectional circuit elements, such as varistors 13, and applied to an amplitude comparator circuit, described further below. The summing resistors 12 of network 10 are connected to the normally saturated plates of a plurality of register toggles 15, described further below with reference to Fig. 3. The summing resistors 12 of network 11 are connected to the normally cut-off plates of the register toggles 15.

The information message to be checked comprises, in this specific embodiment, negative pulses 17 which are applied to the register toggles 15 to trip these toggles. The operation of the toggles 15 and the summing networks 10 and 11 can most readily be appreciated from considering specific values, which are to be understood, of course, as merely exemplary of one specific embodiment of this invention and in no way limiting the invention. When the toggles 15 are all in their normal or untripped condition a positive voltage, which in our illustrative case we may consider as 90 volts, is applied to each of the summing resistors 12 of network 10, and a positive voltage of 150 volts is applied to each of the summing resistors 12 of network 11. When two negative pulses 17 are applied to two of the toggles 15, these toggles are tripped and positive going pulses 19 are delivered to network 10. These pulses 19 may be about 60 volts so that the voltage applied to two of the resistors 12 of network 10 is raised to 150 volts.

Figure 2:
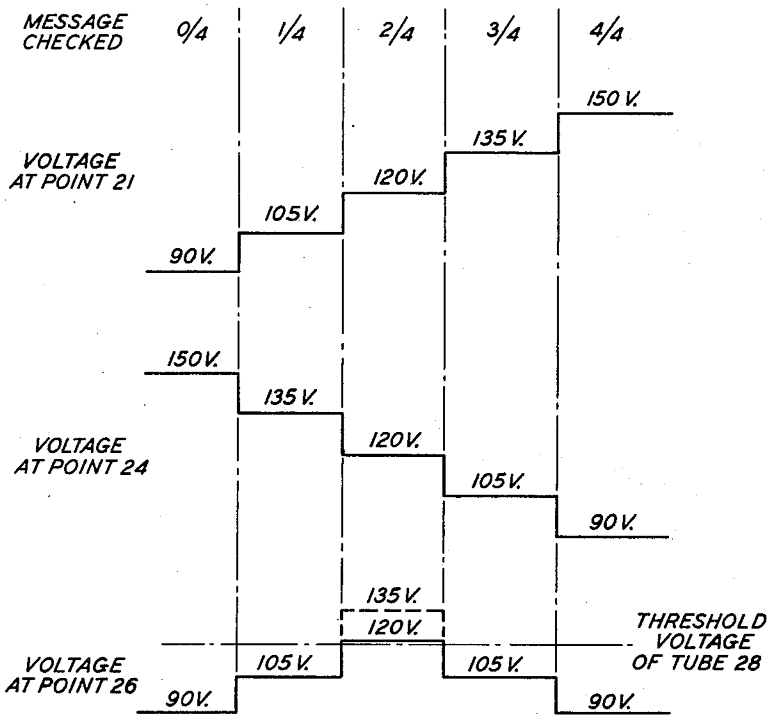
Fig. 2 is a plot of voltages at various points in the circuit of Fig. 1 on the occurrence of proper and improper information messages.

The sum voltage at the common point 21 of the summing network 10 is shown at Fig. 2. When no information pulses are applied to the toggles 15, none of the toggles are tripped and the voltage of point 21 is 90 volts. As the number of toggles tripped increases, the voltage of point 21 will rise in increments of 15 volts for each toggle tripped. Thus for a correctly coded information message comprising two pulses out of a possible four, the voltage of point 21 will be 120 volts, while for an incorrectly coded information message comprising three pulses the voltage of point 21 will be 135 volts. This relationship may be generalized by saying that if an $x$-out-of-$n$ code is being checked the voltage of the common point of the summing network 10 will rise $V/n$ volts for each toggle tripped where V is the amplitude of the positive voltage pulse when the toggles are tripped.

When the toggles are in their normal or untripped condition for the exemplary case we are considering, the resistors 12 of summing network 11 each have 150 volts applied to them. When a toggle is tripped that toggle will deliver a negative-going voltage pulse 23 advantageously of the same amplitude as the pulse 19, which in this instance may be 60 volts. Turning again to Fig. 2, the voltage at the summing point 24 of network 11 will thus decrease in steps of $V/n$ volts for each toggle that is tripped by an information pulse. In this instance the voltage will decrease from 150 volts to 135 volts for a one-out-of-four coded information message and again to 120 volts for a correct two-out-of-four coded information message.

The voltages at points 21 and 24 are applied through the unidirectional current elements or varistors 13 to point 26, the varistors 13 being so poled that the combining circuit defined by the varistors delivers at point 26 the lower of the two voltages from the summing networks. This is depicted in Fig. 2 where it may readily be seen that when the correct condition obtains, that is, when $x$ pulses appear on $n$ leads for the $x$-out-of-$n$ coded information being checked, the sum voltages from both summing networks will be the same, which in this instance is 120 volts, and this voltage will be the voltage of point 26. When too few toggles are tripped, which is indicative of an improper $y$-out-of-$n$ coded information message where $y$ is less than $x$, the sum voltage at point 21 will be less than 120 volts; when too many toggles are tripped, which is indicative of an improper $y$-out-of-$n$ coded information message, where $y$ is greater than $x$, the sum voltage at point 24 will be less than 120 volts. In either instance the final output voltage at point 26 will be less than 120 volts.

The voltage at point 26 is applied to the grid of a threshold biased triode 28 in a regenerative amplitude comparator circuit 29, which may be of the Schmitt trigger circuit type. In such a circuit, conduction shifts abruptly from triode 30 to triode 28 at a specified input voltage. For low values of input voltage, the grid of triode 30 is maintained at approximately 120 volts; triode 30 conducts and triode 28 is cut off. When the grid of tube 28 is raised to a voltage only slightly lower than that of the grid of tube 30, conduction begins in tube 28. As a result of the regenerative circuit connections of the two tubes, triode 28 then rapidly comes into full conduction and triode 30 is cut off. In accordance with this invention, the grid of triode 30 is biased and the parameters of the circuit so chosen that triode 28 will conduct when the voltage applied to it from the summing networks is slightly less than, in the specific example discussed above, 120 volts; this may be generalized by saying that tube 28 conducts when the voltage applied to it is slightly less than $B+x/nV$ volts, but greater than $$B+\frac{(x-1)}{n}V$$

volts, where $x$, $n$ and V are defined as above and B is the voltage applied to the grid of tube 28 for a zero-out-of-$n$ information message.

When voltage steps are combined in a summing network composed of $n$ equal resistors 12 the per channel voltage increment at the output point 21 or 24 is equal to $1/n$ of the voltage V of the pulses 19 and 23, as described above. In the exemplary embodiment described above, $V=60$ volts, $n=4$, and each voltage increment was ideally 15 volts. For larger codes where $n$ is greater than 4, the per channel voltage increment is correspondingly decreased. These relationships, however, assume that the summing network is terminated in an open circuit and therefore represent an idealized case. Actually some terminating resistance is necessary in order to provide the biasing current required for proper operation of the varistor combining circuit comprising varistors 13. If the summing networks are terminated in a finite positive resistance, the per channel voltage increment is reduced below the idealized value of $V/n$ volts by an amount depending on the value of the terminating resistance, and the per channel increment may become so small that satisfactory operating margins are not attained. The problem is further complicated by the fact that for an incorrect information message only one of the two summing networks 10 and 11 controls the network output, while for a correct information message both summing networks work in parallel to control the output. I have discovered that this fact greatly aggravates the deleterious effect of the finite positive terminating resistance on the per channel voltage increment.

In accordance with one feature of this invention, positive and definite operation of the amplitude comparator circuit 29 is assured on output voltages from the combining network indicating a correct coded information message being checked while operation on possible incorrect coded information messages which might cause an output voltage above that indicated for that coded message, such as above 105 volts for a one-out-of-four coded message in the specific exemplary embodiment described with reference to Fig. 2, is deterred. In order to trigger the amplitude comparator circuit 29, the voltage from the combining network must be above the threshold voltage of the circuit. If this threshold voltage is set exactly at the voltage attained by the last increment, e. g., 120 volts in the embodiment depicted in Figs. 1 and 2, two difficulties are encountered: first, it is possible due to leakage impedances and various possible resistances in the circuitry, that in a given case the last step will not rise to its maximum possible value. If the threshold voltage is set at this maximum, these correct coded information messages will nevertheless cause the circuit to indicate that the message is improper under these conditions. The second and more important problem is that if the voltage applied to the circuit is just at the threshold voltage, the response of the circuit is sluggish and may allow the normally conducting tube 30 to remain conducting either continuously or sporadically with the normally cutoff tube 28.

In accordance with a feature of my invention, however, positive feedback is provided between the plate of triode 30 to the grid of triode 28 by a resistor 32. Then when the circuit is triggered the voltage at the plate of triode 30 will increase faster than the voltage at the grid of triode 28, due to the amplification of the triode, and current will flow through resistor 32 towards the grid of triode 28. This will cause the terminating resistance of the combining network to appear negative once the threshold voltage has been reached. The effect on the output voltage from the combining network will be to increase the voltage at point 26. As indicated in Fig. 2 by the dotted step for the correct two-out-of-four coded message, the voltage of this last step may be increased by 10 volts or more. In the specific exemplary embodiment described with respect to Fig. 2 the voltage at point 26 was increased from 120 volts to 135 volts. Thus, due to this negative terminating resistance which only appears when the threshold voltage has been reached, positive and definite action by the amplitude comparator circuit is assured even though the circuit is biased so that the threshold is substantially at the maximum voltage attained by the last increment of the combining network.

I have found it advisable to adjust the threshold voltage by adjusting the variable resistor 33 so that the threshold voltage is slightly below the maximum voltage attainable by the last voltage step of the combining network. Thus a sufficient margin is provided for voltage outputs from the combining network which might not attain the maximum possible value. However, by providing a negative terminating resistance in the region of the last voltage increment the threshold need not be set so low as to increase the possibility of operation of the comparator circuit on incorrect symbols in order to assure accurate and positive operation of the comparator circuit.

A gating tube circuit 34 is provided to deliver OK or NG pulses signifying correct or incorrect codes respectively on separate leads under control of the amplitude comparator circuit 29. The two plates of triodes 28 and 30 are direct current coupled to the two grids of triodes 35 and 36 of the gating circuit. When a correctly coded message is being checked, the grid of triode 35 is at a lower potential than the grid of triode 36. The cathodes of both tubes are maintained at a voltage sufficiently more positive than the grids of both tubes, until an information message is being checked, that neither tube is conducting. When it is desired to ascertain whether a proper or improper message is being checked a negative synchronizing pulse 38 is generated by a synchronous pulse generator 39 and applied to both cathodes. It has been found advantageous to employ a synchronizing pulse 38 so that sufficient time may elapse after appearance of the code pulses 17 at the toggles 15 for all elements of the circuits to have reached stable states before pulses indicating the proper or improper conditions are transmitted from the circuit. When the synchronizing pulse 38, which may be a negative going pulse of about 25 volts gated by conditions indicating that a check is desired, appears while a correct or proper symbol is being checked, triode 36 begins to conduct and a negative going OK pulse 41 appears on lead 42; at this time triode 35 remains cut off. However, when an incorrect symbol has been set up, the voltage conditions on the grids are reversed and a negative going NG pulse 43 appears on lead 44 when the synchronizing pulse 38 is applied to the two cathodes.

While the output from only a single combining circuit has been applied to the amplitude comparator circuit 29, it is to be understood that several such combining networks may be simultaneously connected to the common point 26 in order to form a checking circuit for a multidigit number, each of whose digits is expressed in an $n$-out-of-$x$ code. Then, since the output voltages of all the networks are the same for a plausible information message, the proper threshold voltage will only be applied to the grid of triode 28 if each digit is plausible in terms of the code. I have found, however, that desirable operating margins limit the number of distinct input networks to about 3.

Figure 3:
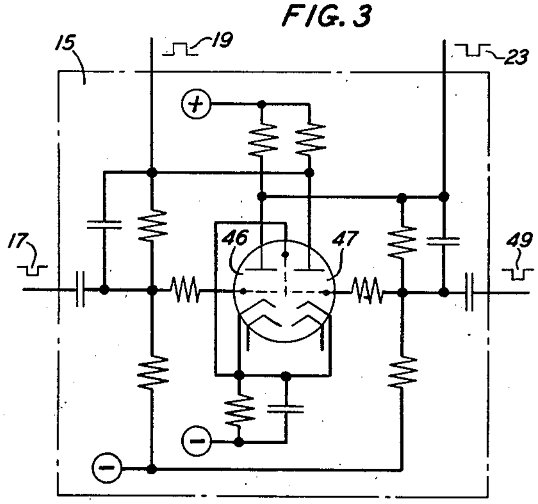
Fig. 3 is a schematic representation of one register toggle circuit that may be utilized in the specific embodiment of this invention depicted in Fig. 1.

One register toggle 15 that may be employed in the combination of this invention is depicted in Fig. 3 and comprises a pair of triodes 46 and 47 arranged so that conduction shifts from triode 47 to triode 46 on the occurrence of the negative code pulse 17, thereby generating the output pulses 19 and 23. Advantageously a reset pulse 49 is applied, as from a reset pulse generator 50, to each of the toggles 15 to cause conduction to shift back from tube 46 to tube 47, after the message has been checked.

While in the specific embodiment described above with reference to Fig. 1, *n* was an even number, it is to be understood that dummy channels could be provided, if *n* is an odd number, to translate artificially the code being checked to a different code wherein *n* is an even number, as disclosed in the above mentioned application of W. A. Malthaner and D. H. Ring.

Therefore, it is to be understood that while specific embodiments of this invention have been described above, they are merely illustrative of the application of the principles of the invention. Numerous other arrangements may be devised by those skilled in the art without departing from the spirit and scope of the invention.

What is claimed is:

1. A checking circuit comprising a pair of summing networks, each of said networks comprising a plurality of equal impedances having a common point and each impedance of one network being paired with an impedance of the other network, means for increasing the voltage at the common point of one network and correspondingly decreasing the voltage at the common point of the other network in response to the number of information pulses in the message being checked, an amplitude comparator circuit, means for applying to said comparator circuit the lower of said voltages at said common points, means biasing said comparator circuit for operation only when the voltages of said common points are equal, means for presenting a negative terminating resistance to said summing networks on the application to said comparator circuit of the voltage occurring when said voltages at said common points are equal, and means dependent on the condition of said comparator circuit indicating the correctness of said coded information message.

2. A circuit for checking information messages in *x*-out-of-*n* codes comprising *n* register toggle circuits, a pair of summing networks, each of said networks comprising *n* equal resistors having a common point and each resistor of one network being paired with a resistor of the other network, means for applying the pulses of the code symbol being checked to said toggle circuits to trip said toggle circuits, means for increasing the voltage on one of said resistors of one network for each toggle circuit tripped and decreasing the voltage on said paired resistor of said other network, an amplitude comparator circuit, unidirectional current means connected to the common point of each of said summing networks and to said comparator circuit, said unidirectional current means being so poled as to allow passage to said comparator circuit of the lower of the voltages at said common points, means biasing said comparator circuit for operation on application thereto of voltages but slightly less than said voltages at said common points when said voltages are equal, and means for presenting a negative terminating resistance to said voltage from said unidirectional current means when said voltages at said common points are equal to increase the voltage from said unidirectional current means.

3. A checking circuit comprising a comparator circuit, means for applying to said comparator circuit a voltage dependent on the number of pulses in the coded information message to be checked, a correctly coded message being indicated by a maximum voltage, means for presenting a negative terminating resistance to said last mentioned means on application to said comparator circuit of said maximum voltage, and means dependent on the condition of said comparator circuit for indicating the correctness of said coded message.

4. A checking circuit in accordance with claim 3 wherein said means for presenting a negative terminating resistance comprises a positive feedback path in said comparator circuit.

5. A checking circuit comprising a comparator circuit including a first and a second electron discharge device, means for applying to said first device a voltage dependent on the number of pulses in the coded information message to be checked, a correctly coded message being indicated by a maximum voltage, means for biasing said first device at threshold for operation on application thereto of voltages but slightly less than said maximum voltage, means for presenting a negative terminating resistance to said voltage applying means on application to said device of said maximum voltage, said last mentioned means comprising means for providing positive feedback from said second device to said voltage applying means, and means dependent on the condition of said comparator circuit for indicating the correctness of said coded message.

References Cited in the file of this patent

UNITED STATES PATENTS

| Number | Name | Date |
|---|---|---|
| 2,512,038 | Potts | June 20, 1950 |
| 2,622,148 | Van Duuren | Dec. 16, 1952 |